June 4, 1957  F. L. KATZMANN ET AL  2,794,916
SWEEP CIRCUIT

Filed Oct. 11, 1954  2 Sheets-Sheet 1

INVENTOR.
FRED L. KATZMANN
BY ROBERT F. CASEY

ATTORNEYS

2,794,916

Patented June 4, 1957

2,794,916

SWEEP CIRCUIT

Fred L. Katzmann, New York, N. Y., and Robert F. Casey, Pompton Plains, N. J., assignors to Allen B. Du Mont Laboratories, Inc., Clifton, N. J., a corporation of Delaware Application October 11, 1954, Serial No. 461,345

4 Claims. (Cl. 250—27)

This invention is concerned with sweep generators and particularly those having variable sweep speeds.

Heretofore generators of this type have been "time-operated" devices. A time-constant was selected for the sweep generating circuit and exactly the same time-constant had to be present in the multi-vibrator. At higher sweep speeds inherent stray capacitance in the recycling circuit become increasingly troublesome altering its time-constant. As is well understood complex tracking was required to keep the circuits properly synchronized, and these conditions became more and more involved at higher sweep speeds.

A substantial increment of novelty is present in the circuits of this invention in that it is a "level-operated" device utilizing negative current feedback. Particular values of voltage or current may be selected to trigger the re-cycling circuit into either "sweep" or "retrace" operation. Thus the stray capacitance is minimized because there is no requirement of a time-constant in the recycling circuit; only one time-constant is required, namely that of the sweep circuit. With such a combination a minimum of precision components are used and complex tracking arrangements are obviated. With the circuits of this invention sweep speeds from 1,000 second down to 0.2 microsecond, or a range of $5 \times 10^9$, are obtained. As is well understood in this art, prior circuits of this range of sweep speeds have been extremely bulky, complicated and expensive.

One object of this invention, therefore, is to provide a one-time-constant sweep-generator with a large range of sweep speeds.

Another object of this invention is to provide a sweep-generator using negative current feedback in the recycling circuit.

Still another object of the invention is to provide a simpler circuit of greater range of sweep speeds than heretofore possible.

Another object of the invention is to provide a simpler circuit for faster sweep speeds than heretofore possible.

From the following disclosure other objects of this invention will be apparent to those skilled in this art.

Figure 1:
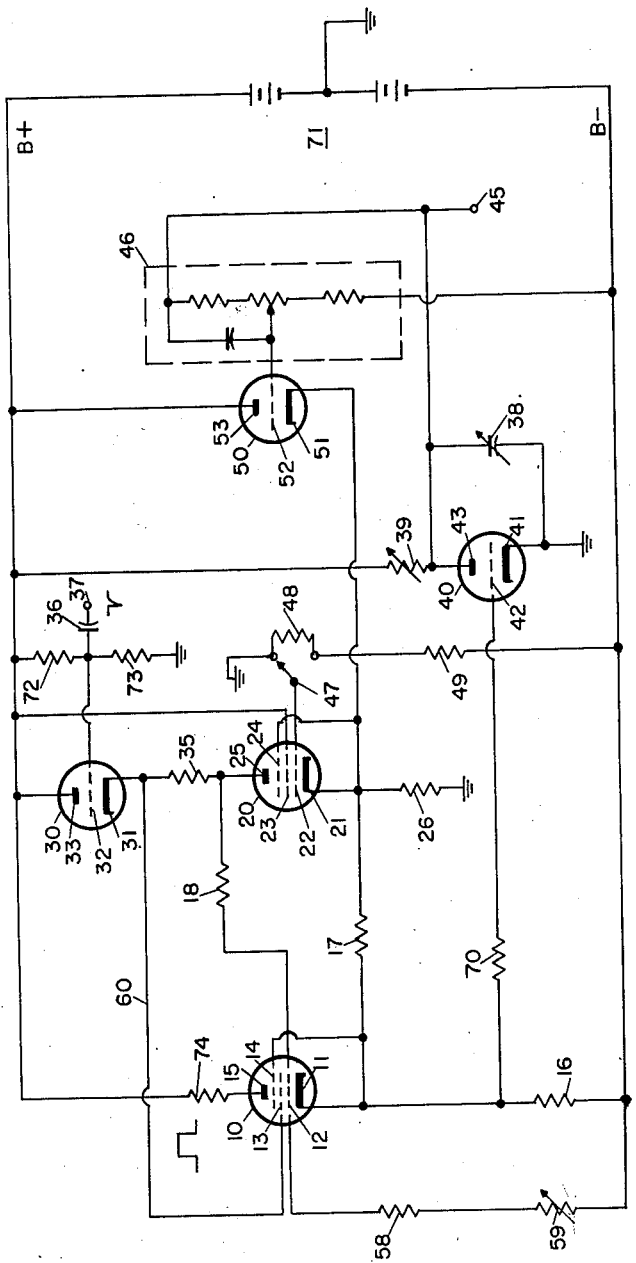
Figure 2:
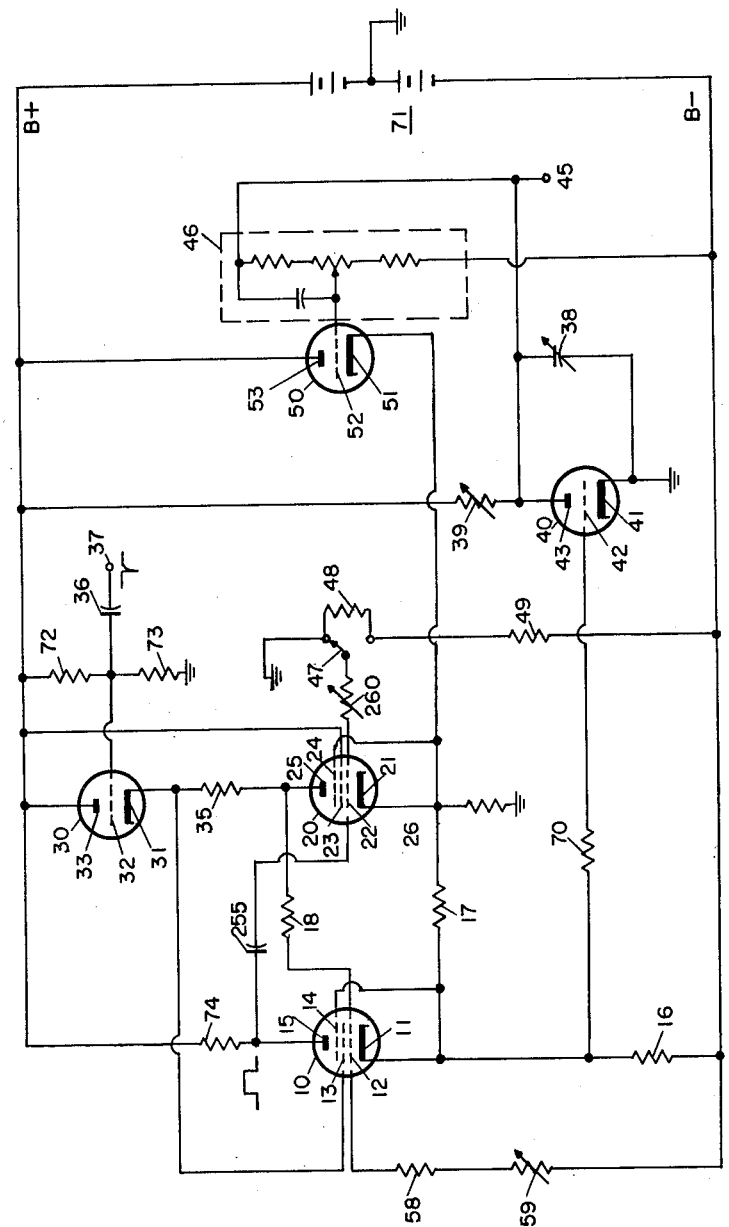

In the accompanying drawings,

Figure 1 is a schematic and diagrammatic representation of one form of the invention; and Figure 2 is a similar illustration of a modified form of the invention.

To facilitate the following explanation the following definitions will be helpful:

"Upvolting" means raising the potential but not necessarily to a positive value.

"Downvolting" means lowering the potential but not necessarily to a negative value.

"Cathode-follower action" means that the cathode follows its respective grid while the grid is being upvolted or downvolted.

Referring now to Figure 1, the electron tubes 10 and 20 are interconnected as illustrated so that if the conductivity of either of these tubes increases the conductivity of the other automatically decreases. As illustrated, the electron tubes employed in this circuit have respectively cathodes 11 and 21, control grids 12 and 22, screen grids 13 and 23, suppressor grids 14 and 24 and anodes 15 and 25. Each of these tubes is connected as a cathode follower amplifier through respective cathode-load resistors 16 and 26 and these cathodes are conductively interconnected through a resistor 17 which forms the negative current-feedback link to be hereinafter described. The suppressor grids 14 and 24 are conductively directly connected to the respective cathodes 11 and 21. The control electrode 12 is conductively connected through a resistor 18 to the anode 25. This resistor provides a regenerative connection between these two electrodes. Control grid 12 is also connected through a fixed resistor 58 and a variable resistor 59 to the B— terminal of a suitable source of B potential 71, illustrated as a battery having a midpoint grounded as shown.

An anode 25 of the electron tube 20 is connected through a resistor 35 to the cathode 31 of an electron tube 30. The screen grid 13 of electron tube 10 is conductively connected to this cathode. Anode 15 is conductively connected through resistor 74 to B+ and anode 33 is directly connected to the B+ terminal. The control electrode 32 of electron tube 30 is connected through a blocking capacitor 36 to the synchronized signal input terminal 37 and to the midpoint between a pair of resistors 72 and 73, the latter of which is grounded at one end and the former of which is connected to B+. The control electrode 22 is connected by means of a switch 47 either directly to ground or to B— through a voltage divider comprising the resistors 48 and 49 in series. At this point it may be noted that electron tube 30 can be thought of as a synchronous signal injector tube, or the "sync-tube," and is connected as a cathode follower amplifier.

At 40 is an electron tube which performs a function of controlling the sweep-capacitor 38 and is sometimes referred to herein as a "switch-tube." Its cathode 41 is grounded and the sweep-capacitor 38, which is variable, is interconnected between the cathode 41 and the anode 43. This anode is connected through a variable resistor 39 to B+ while the control electrode 42 of this tube is connected through a resistor 70 to the cathode 11.

Electron tube 50, which can be referred to as the "turn off" tube, has its anode 53 directly connected to B+ and its cathode 51 directly connected to cathode 21 of electron tube 20. Control electrode 52 is connected to the movable contact of a voltage-divider assembly 46, comprising a pair of resistors in series, one terminal of which is connected to B— and the other terminal of which is connected to the sweep output terminal 45. This terminal is directly connected to anode 43 of the switch-tube. The movable contact of the voltage-divider 46 is connected through a capacitor to the lead of output terminal 45, as shown.

Describing the operation of this circuit it will be assumed that tube 10 is heavily conducting and hence tube 20 is conducting lightly. At this time the momentary application of a negative-going sync signal is applied to terminal 37, downvolting control grid 32, and due to cathode-follower action 31, this downvolting is transmitted momentarily through connection 60 to screen grid 13. The following regenerative action quickly follows: cathode 11 is downvolted a like amount by cathode follower action and cathode 21 is downvolted to a lesser degree, due to the action of resistor 17. However, anode 25 is greatly downvolted due to the amplifying action of tube 20. This lowered potential is transmitted through resistor 18 to control grid 12, further downvolting cathode 11. As this regenerative action is cumulative, tube 20 tend towards full conductivity, while tube 10 goes towards cut-off. As this occurs, cathode 11 is downvolted towards B—, downvolting control grid 42 of the switch-tube to cut-off. Generalizing, it will be seen that cut-off of tube 40 is initiated by tube 10.

As soon as switch-tube 40 reaches cut-off, sweep-capacitor 38 begins to charge up through the variable resistor 39. In the circuit as shown this sweep-voltage will rise exponentially, but as those skilled in the art will understand, linearizing elements could be used in the circuit.

The rising potential of capacitor 38 appears at the output terminal 45, and through the action of the compensated voltage-divider 46, it also appears at control grid 52 of the "turn-off" tube 50. As control grid 52 is upvolted, this tube eventually becomes conductive, thereby upvolting cathode 51 by cathode-follower action. Since cathode 51 is directly connected to cathode 21, the latter is also upvolted and the previously described regenerative loop quickly transfers conductivity from tube 20 to tube 10. As cathode 11 is upvolted, it in turn upvolts control grid 42, which starts up switch-tube 40. This tube, therefore, becomes conductive, permitting sweep-capacitor 38 to discharge through it, producing the retrace or flyback portion of the cycle. Thus it is apparent that tube 40 switches the generator from a "sweep" to "retrace" and that this action is initiated by tube 10.

To recapitulate, when switch-tube 40 is cut off the sweep-voltage increases eventually rendering turn-off tube 50 conductive. As cathode follower action upvolts cathode 51, grid 42 is also upvolted, starting up the switch-tube 40 to discharge sweep-capacitor 38 and thus turn off the sweep. This illustrates the reason for naming the electron tube 50 the "turn-off" tube. However, any attempt to cut-off switch tube 40 results in charging up sweep-capacitor 38 and the sweep voltage holds at a particular value.

The above holding condition is corrected by the use of the regenerative circuit previously described and the current-feedback resistor 17. This resistor prevents the full scope of potential change at cathode 51 from being applied to the control grid 42. Secondly, it permits the regenerative circuit to effect the actual upvolting and downvolting of cathode 11 and control-grid 42, thereby developing a powerful drive signal in tube 40.

As suggested at the beginning, there is only one functional time-constant present in this circuit, namely that of the saw producing circuit comprising capacitor 38 and resistor 39, either or both of which as illustrated, may be variable. This circuit, using current feedback, inherently requires lower values of resistance as compared with prior art voltage feedback circuits. Since a time-constant is the product RC and C is the stray capacitance, these lower inherent values of R provide a lower time constant which more quickly discharges stray capacitance, thus minimizing its effect on the circuit.

In order to provide for either recurrent or triggered action, control-grid 22 is connectible to switch 47, so that the bias, as determined by voltage divider action of resistors 48 and 49 connected in series between B— and ground, may be either ground potential or below. As will be understood, the more negative setting will require a sharp sync pulse to initiate action. Similarly, control-grid 12 has an adjustable bias through the action of a voltage divider comprising sync-tube 30, resistors 35, 18 and 58, and variable resistor 59.

The circuit of Figure 2 is basically the same as that of Figure 1, but includes additional elements. As shown anode 15 is connected through a capacitor 255 to control electrode 22 and a variable resistor 260 is connected between this electrode and switch 47. Pulses of long duration have always been a problem because sync pulses which arrive before the end of the pulse tend to trigger the circuit into a receptive state. These new elements 255 and 260 form a lock-out circuit in the following manner: When tube 10 becomes conductive, anode 15 is sharply downvolted. This negative potential is transmitted through capacitor 255 to control electrode 22, which thus prevents tube 20 from becoming conductive. Variable resistor 260 determines the rate at which this charge leaks off, and therefore the interval of lock-out. Thus the circuit is prevented from reaching a respondent state for a predetermined period which can be adjusted by means of variable resistor 260.

It will be apparent to those skilled in the art that the variable sweep-capacitor 38 and variable-resistor 39 control the sweep-speed or rate of change of sweep-voltage, while the potential applied to control grid 52 determines the amplitude of the sweep voltage.

From the above description it will be apparent to those skilled in the art how the advantages of this invention as set out herein are accomplished. It will be equally apparent that changes in the details of circuit connections and components may be made while employing the novel subject matter herein disclosed. We prefer, therefore, to have the disclosure herein taken in an illustrative sense and that the scope of protection afforded be that of the appended claims.

We claim:

1. A sweep generator system of the type described comprising a pair of electron tubes each having a cathode, an anode, a control electrode, a screen grid and a suppressor grid, said tubes being interconnected to form a regenerative circuit including a conductive connection including a resistance between said cathodes, a sweep voltage generator including a sweep resistor and a sweep capacitor, and an electron tube having an anode, a cathode and a control electrode, said sweep capacitor being connected across said last cathode and anode and said sweep resistor being connected to said anode, a connection from said last control electrode to the cathode of one of said pair of tubes, a turn-off tube comprising an electron tube having a cathode, a control electrode and an anode, an output circuit to said sweep capacitor including a voltage divider, a connection between said last control electrode and said voltage divider, a connection from said last cathode to the cathodes of said pair of electron tubes, and a source of sync signal including an electron tube having an anode, a cathode and a control electrode, said last cathode being connected to the anode of one of said pair of electron tubes and an input circuit connected to said last control electrode.

2. A circuit for generating sawtooth voltage signals, said circuit comprising a condenser across which said sawtooth signals are developed; a switching tube having an anode and a cathode connected to opposite terminals of said condenser effectively to short circuit the condenser when the tube is conductive; a source of direct anode voltage for said tube; a charging resistor connected in series between said anode and the positive terminal of said source; a source of switching voltage connected to said switching tube to actuate the switching thereof, said source comprising first and second regenerative tubes each having a cathode; a grid, and an anode, a connection from the anode of said first regenerative tube to the grid of said second regenerative tube, a first resistor connected in series between the cathodes of said regenerative tubes, a second resistor connected in series between the cathode of said first regenerative tube and a source of fixed potential, a third resistor connected in series between the cathode of said second regenerative tube and a second source of fixed potential negative with respect to said first-named source of fixed potential; a connection between said switching tube and the cathode of said second regenerative tube whereby said switching tube is made non-conductive when said first regenerative tube becomes non-conductive, thus allowing said capacitor to charge up and develop a sawtooth voltage wave thereacross; and a connection between said capacitor and said first regenerative tube whereby said first regenerative tube becomes conductive when the voltage across said capacitor has built up to a predetermined level, said first resistor operating to establish different voltage levels on the cathodes of said regenerative tubes to enhance the operation of said switching tube.

3. The circuit of claim 2 in which the connection between the cathode of said second regenerative tube and said switching tube comprises a resistor having one terminal connected to the grid of said switching tube and serving to limit the grid current thereof during such times as said switching tube is conductive.

4. A combination as described comprising: a sweep voltage generator including a switch tube, a sweep capacitor, a sweep resistor and an output circuit; a regenerative circuit including a pair of multi-electrode electron tubes interconnected to form a regenerative circuit, a capacitive connection between the anode of one of said tubes and a control electrode of the other of said tubes, means for biasing one of the control electrodes of said other tube, said means including a variable resistor to provide a lockout action of a predetermined interval; a connection from said regenerative circuit to said switch tube; a turnoff tube connected to said output circuit through a voltage divider; a connection from said regenerative circuit to said turnoff tube; means for applying a sync signal to said regenerative circuit; and a connection, including a variable resistor, to another control electrode of one of said pair of electron tubes.

References Cited in the file of this patent

UNITED STATES PATENTS

| | | |
|---|---|---|
| 2,265,290 | Knick | Dec. 9, 1941 |
| 2,414,486 | Rieke | Jan. 21, 1947 |
| 2,415,929 | Bond | Feb. 18, 1947 |
| 2,435,207 | Dimond | Feb. 3, 1948 |
| 2,562,188 | Hance | July 31, 1951 |
| 2,596,167 | Philpott | May 13, 1952 |